(12) United States Patent
Yamamoto

(10) Patent No.: US 8,957,890 B2
(45) Date of Patent: Feb. 17, 2015

(54) INFORMATION PROCESSING APPARATUS AND INFORMATION PROCESSING METHOD

(75) Inventor: Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 300 days.

(21) Appl. No.: 13/011,403

(22) Filed: Jan. 21, 2011

(65) Prior Publication Data

US 2011/0227826 A1 Sep. 22, 2011

(30) Foreign Application Priority Data

Jan. 29, 2010 (JP) ............... P2010-019083

(51) Int. Cl.
| | | |
|---|---|---|
| G06F 3/048 | (2013.01) | |
| G06F 3/038 | (2013.01) | |
| G06F 3/041 | (2006.01) | |
| G06F 3/01 | (2006.01) | |
| G06F 3/0346 | (2013.01) | |

(52) U.S. Cl.
CPC .............. *G06F 3/038* (2013.01); *G06F 3/0418* (2013.01); *G06F 3/017* (2013.01); *G06F 3/0346* (2013.01)
USPC .............................. 345/419; 463/36; 715/863

(58) Field of Classification Search
CPC .............. G06F 3/0346; G06F 3/04812; G06F 2203/0381; G06F 3/04815; G06F 3/017
USPC ......... 178/18, 4, 18.07, 19.02, 19.03; 52/395; 345/156–159, 163, 173–175, 179, 180, 345/419; 340/12.55, 13.31; 455/41.2, 566; 348/564, 734; 463/37, 43, 36; 714/819; 715/721, 810, 821, 856, 273, 702, 857, 715/858, 862, 863; 725/44; 379/433.04; 702/85, 94, 95, 142, 152; 382/107; 700/17, 18
See application file for complete search history.

(56) References Cited

U.S. PATENT DOCUMENTS

| | | | |
|---|---|---|---|
| 2002/0038178 A1* | 3/2002 | Talkenberg et al. .......... | 701/200 |
| 2002/0140666 A1* | 10/2002 | Bradski ......................... | 345/156 |
| 2003/0051615 A1* | 3/2003 | Denoue et al. .................. | 101/45 |
| 2003/0095155 A1* | 5/2003 | Johnson ........................ | 345/864 |
| 2004/0080507 A1* | 4/2004 | Von Prittwitz ................ | 345/419 |
| 2007/0060384 A1* | 3/2007 | Dohta ............................. | 463/43 |
| 2008/0165160 A1* | 7/2008 | Kocienda et al. ............. | 345/175 |
| 2009/0117958 A1* | 5/2009 | Ueshima et al. .................. | 463/8 |
| 2009/0149257 A1* | 6/2009 | Ferguson et al. .............. | 463/37 |

(Continued)

FOREIGN PATENT DOCUMENTS

| | | |
|---|---|---|
| JP | 5-19970 | 1/1993 |
| WO | WO 2008/149991 A1 | 12/2008 |

(Continued)

*Primary Examiner* — Michael J Eurice

(74) *Attorney, Agent, or Firm* — Oblon, Spivak, McClelland, Maier & Neustadt, L.L.P.

(57) ABSTRACT

There is provided an information processing apparatus including a position detection section which detects a position of an object, and a coordinate calculation section which calculates absolute coordinates based on the position of the object detected by the position detection section, and which calculates relative coordinates, which indicate a display position of the object on a screen, depending on the absolute coordinates and a motion of the object. The coordinate calculation section moves the relative coordinates in order for the relative coordinates to be asymptotic to or correspondent to the absolute coordinates based on a predetermined condition.

17 Claims, 11 Drawing Sheets

(56) References Cited

U.S. PATENT DOCUMENTS

| | | | |
|---|---|---|---|
| 2009/0153475 A1* | 6/2009 | Kerr et al. | 345/157 |
| 2009/0158203 A1* | 6/2009 | Kerr et al. | 715/784 |
| 2009/0265671 A1* | 10/2009 | Sachs et al. | 715/863 |
| 2009/0309830 A1 | 12/2009 | Yamamoto et al. | |
| 2010/0039382 A1 | 2/2010 | Kumagai et al. | |
| 2010/0103100 A1 | 4/2010 | Yamamoto | |

FOREIGN PATENT DOCUMENTS

| | | |
|---|---|---|
| WO | WO 2008/156141 A1 | 12/2008 |
| WO | WO 2009/035124 A1 | 3/2009 |
| WO | WO 2009/069531 A1 | 6/2009 |

* cited by examiner

INFORMATION PROCESSING APPARATUS AND INFORMATION PROCESSING METHOD

BACKGROUND OF THE INVENTION

1. Field of the Invention

The present invention relates to an information processing apparatus and an information processing method.

2. Description of the Related Art

In recent years, in order that CE (Consumer Electronics) devices such as a TV (TeleVision) meet increasingly complex operation by a user (also referred to as "operator"), there has been an attempt to provide the TV with a GUI (Graphical User Interface) and an operation input device of a free cursor-type, which a PC (Personal Computer) is generally provided with. The increasingly complex operation by a user is mainly attributed to that new functions are added to the CE device and that the CE device is connected to a network and can acquire various pieces of information via the network, for example.

There are developed various operation input devices, and examples thereof include a mouse and a touch pad. Further, in the case where the operation input devices such as the mouse and the touch pad are to be used, the following circumstances occur: it takes a long time to master the usage the devices and it is difficult, in particular, for the children, the elderly, and the like to adapt to the mouse and the touch pad. From such circumstances, there is suggested an operation input device which operation can be input to by spatial operation of a user moving his/her hand on a space.

As an operation input device capable of inputting operation by spatial operation, there is particularly suggested a hand gesture interface which associates coordinates of a specific position of the user's hand with coordinates of a cursor displayed on a screen by using a camera. Further, as an operation input device capable of inputting operation by spatial operation, there is suggested a controller using an image sensor.

In the case where the operation input device capable of inputting operation by spatial operation as described above is used, the user can perform a pointing operation using absolute coordinates, and, since a position designated by the user is directly associated with a position of a pointer on the screen, there are advantages that the operation is intuitive and easily understandable. On the other hand, however, since the motion of the user's operation is precisely reproduced, user's unintended operation is input to the operation input device without being distinguished from user's intended operation, and in particular, it is difficult to input a detailed operation.

In the case of using a difference of coordinates per predetermined time of an operating tool photographed by a camera (velocity value of the operating tool), there can be established a coordinate system (hereinafter, also referred to as "relative coordinates system") in which usability for the user is enhanced. That is, in the same manner as in the case of using a general mouse, it becomes possible to perform pointing operation to a fine object by velocity gain control, and it becomes possible to perform effective noise reduction by nonlinear processing. For example, WO2009/069531 discloses the technique which enables the pointing operation to a fine object by velocity gain control.

SUMMARY OF THE INVENTION

However, in the case of using the relative coordinates system, there was an issue that there occurred displacement in a correspondence relationship between a position designated by the user and a position of a pointer displayed on a screen, and hence, a user easily got confused.

In light of the foregoing, it is desirable to provide a novel and improved technology which is capable of reducing the possibility of confusing the user while ensuring the user-friendliness.

According to an embodiment of the present invention, there is provided an information processing apparatus which includes a position detection section which detects a position of an object, and a coordinate calculation section which calculates absolute coordinates based on the position of the object detected by the position detection section, and which calculates relative coordinates, which indicate a display position of the object on a screen, depending on the absolute coordinates and a motion of the object. The coordinate calculation section moves the relative coordinates in order for the relative coordinates to be asymptotic to or correspondent to the absolute coordinates based on a predetermined condition.

The position detection section may detect, as the position of the object, at least one position from among a position of an operating tool photographed by a camera, a position of an operating tool detected by a touch panel, a position of an operating tool detected by an ultrasonic sensor, and a position of an operating tool detected by a magnetic sensor.

The coordinate calculation section may calculate the relative coordinates based on a velocity value of the object obtained by time-differentiating the absolute coordinates.

The coordinate calculation section may calculate the relative coordinates based on at least one of an angular velocity value detected by a gyro sensor built into a controller operated by a user, an acceleration value detected by an acceleration sensor built into the controller, and an angular acceleration value detected by an angular acceleration sensor built into the controller.

The coordinate calculation section may calculate the relative coordinates in a manner that as an amount of the motion of the object is smaller, an amount of change of the relative coordinates with respect to the absolute coordinates becomes smaller.

The coordinate calculation section may calculate the relative coordinates in a manner that as a frequency of changes in signs of a velocity value of the object or an angular velocity value of the object is larger, an amount of change of the relative coordinates with respect to the absolute coordinates becomes smaller.

The coordinate calculation section may cause the relative coordinates to be asymptotic to the absolute coordinates by sequentially moving the relative coordinates on a line segment from the absolute coordinates to the relative coordinates.

The information processing apparatus may further include a display control section which displays an indicator at a display position which corresponds to the relative coordinates on a screen of a display device.

The coordinate calculation section may cause the relative coordinates to be asymptotic to the absolute coordinates with a velocity value depending on a velocity value of the object or an angular velocity value of the object.

The coordinate calculation section may cause the relative coordinates to be asymptotic to the absolute coordinates with a larger velocity value as the velocity value of the object or the angular velocity value of the object is larger.

The coordinate calculation section may determine whether to cause the relative coordinates to be correspondent to the absolute coordinates or to cause the relative coordinates to be asymptotic to the absolute coordinates based on a magnitude relation between a velocity value of the object or an angular velocity value of the object and a predetermined value.

The coordinate calculation section may cause the relative coordinates to be asymptotic to the absolute coordinates with a velocity value depending on a distance from the absolute coordinates to the relative coordinates.

The coordinate calculation section may determine whether to cause the relative coordinates to be correspondent to the absolute coordinates or to cause the relative coordinates to be asymptotic to the absolute coordinates based on a magnitude relation between a distance from the absolute coordinates to the relative coordinates and a predetermined value.

The coordinate calculation section may cause the relative coordinates to be asymptotic to the absolute coordinates with a velocity value depending on frequency of changes in signs of a velocity value of the object or an angular velocity value of the object.

The coordinate calculation section may cause the relative coordinates to be asymptotic to the absolute coordinates with a larger velocity value as frequency of changes in signs of a velocity value of the object or an angular velocity value of the object is smaller.

The coordinate calculation section may determine whether to cause the relative coordinates to be correspondent to the absolute coordinates or to cause the relative coordinates to be asymptotic to the absolute coordinates based on a magnitude relation between frequency of changes in signs of a velocity value of the object or an angular velocity value of the object and a predetermined value.

When the absolute coordinates is not detected by the position detection section, the coordinate calculation section may not cause the relative coordinates to be asymptotic to or correspondent to the absolute coordinates until the absolute coordinates is detected, and when the absolute coordinates is detected, the coordinate calculation section may cause the relative coordinates to be correspondent to the detected absolute coordinates.

According to the embodiment of the present invention described above, it is possible to reduce the possibility of confusing the user while ensuring the user-friendliness.

DETAILED DESCRIPTION OF THE EMBODIMENTS

Figure 1:
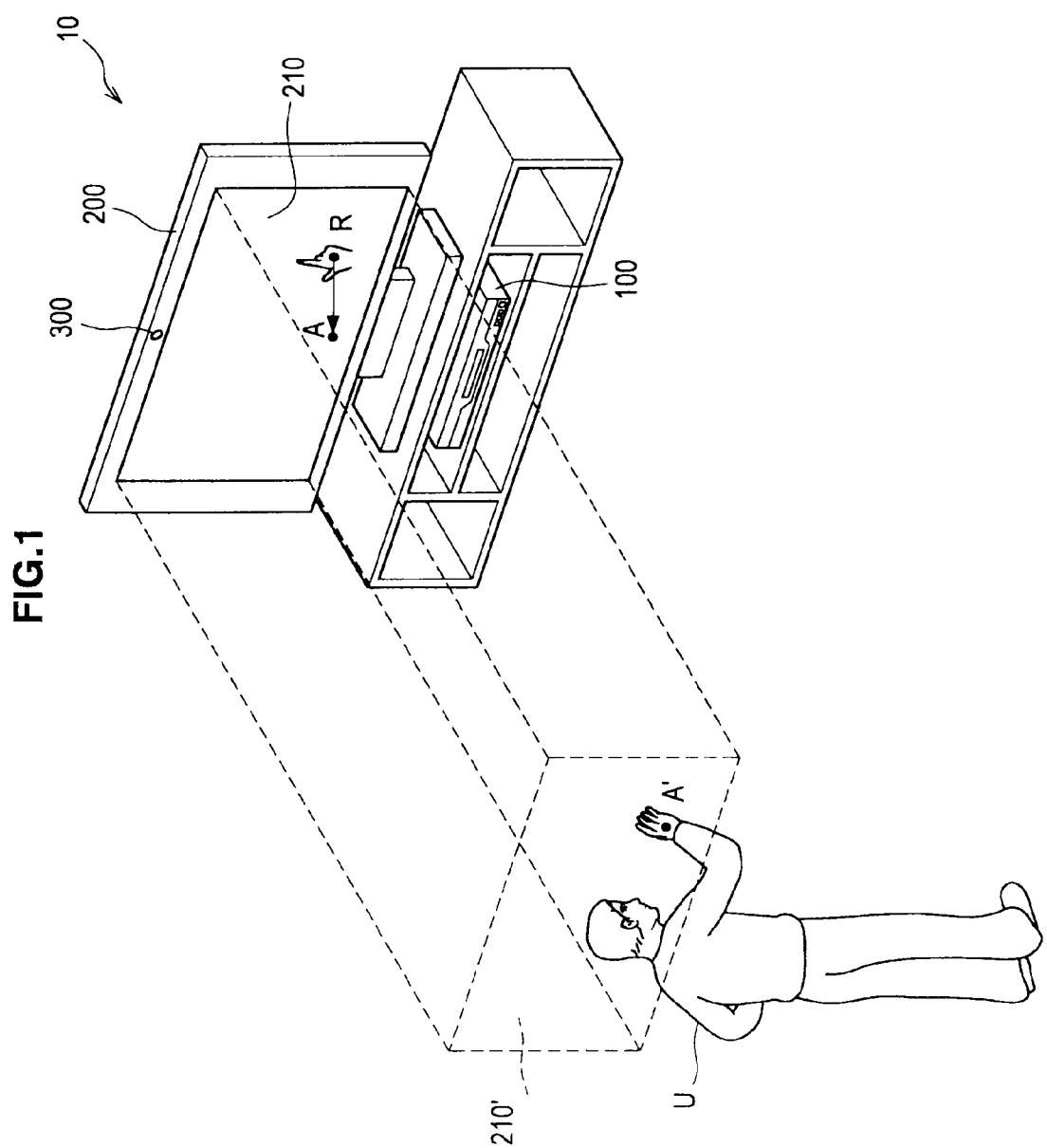
FIG. 1 is a diagram showing a usage example of an information processing system according to an embodiment of the present invention.

Hereinafter, a preferred embodiment of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Embodiment
  1-1. Usage example of information processing system
  1-2. Example of noise reduction used by coordinate calculation section
  1-3. Example of velocity gain control used by coordinate calculation section
  1-4. Functional configuration of information processing apparatus
  1-5. Function that coordinate calculation section of information processing apparatus has
  1-6. Technique (part 1) of causing relative coordinates to be correspondent to or asymptotic to absolute coordinates
  1-7. Technique (part 2) of causing relative coordinates to be correspondent to or asymptotic to absolute coordinates
  1-8. Technique (part 3) of causing relative coordinates to be correspondent to or asymptotic to absolute coordinates
  1-9. Displacement of relative coordinates in case of using LPF
  1-10. Displacement of relative coordinates in case of performing noise reduction
  1-11. Displacement of relative coordinates in case of further performing compensation for relative coordinates
  1-12. Flow of processing executed by information processing apparatus 2. Modified example
3. Summary

1. Embodiment

First, an embodiment of the present invention will be described.

[1-1. Usage Example of Information Processing System]

FIG. 1 is a diagram showing a usage example of an information processing system according to the embodiment of the present invention. With reference to FIG. 1, the usage example of the information processing system according to the embodiment will be described.

As shown in FIG. 1, an information processing system 10 according to the embodiment of the present invention includes an information processing apparatus 100 and a display device 200 which is connected to the information processing apparatus 100. The display device 200 has a function of displaying a screen 210. In front of the screen 210, there is a user (also referred to as "operator") U who views the screen 210.

When the user U moves an operating tool (an example of an object) such as the user's hand in an operation range 210' which corresponds to the screen 210, the information processing apparatus 100 detects a position A' of the operating tool in accordance with video taken by a camera 300 which is provided on the display device 200 or near the display device 200, and calculates absolute coordinates A which indicates a position on the screen 210 of the display device 200 based on the detected position A'. Note that, here, the information processing apparatus 100 analyzes the video taken by the camera 300 to thereby determine a region in which the operating tool is photographed from the video, and specifies, as the absolute coordinates A, a typical position within the determined region (such as the center of gravity of the binary image of the determined region). However, there are assumed various techniques for specifying the absolute coordinates A, and hence, the camera 300 may not be necessarily present. In addition, the camera 300 may not be present also in the case where the input of operation by the user U is not necessary.

For example, in the case where a touch panel is used instead of the camera 300, the position A' of the operating tool is detected as the absolute coordinates A by the touch panel. Further, for example, in the case where a controller operated by the user U is used instead of the camera 300, a position designated by the controller is detected as the absolute coordinates A. In the case where an ultrasonic sensor is used instead of the camera 300, the position A' of the operating tool detected by the ultrasonic sensor is detected as the absolute coordinates A. In the case where a magnetic sensor is used instead of the camera 300, the position A' of the operating tool detected by the magnetic sensor is detected as the absolute coordinates A. Further, for example, a position of a substance included in a moving image which is being reproduced may be detected as the absolute coordinates A, and in that case, however, the input of operation by the user U is not particularly necessary and the camera 300 may not be used.

As described above, there are assumed various techniques for detecting the absolute coordinates A. However, the position of a pointer (an example of an indicator) displayed on the screen 210 of the display device 200 may not completely correspond to the position indicated by the absolute coordinates A. That is, in order to enhance the operation feeling for the user, there is a case where the pointer is displayed at a position indicated by relative coordinates R, which is different from the absolute coordinates A. Although there are assumed various techniques for calculating the relative coordinates R, the relative coordinates R is calculated by the information processing apparatus 100 depending on the absolute coordinates A and physical quantity of the object.

For example, the information processing apparatus 100 can time-differentiate the absolute coordinates A, and can use a velocity value of the object obtained by the time-differentiation as the physical quantity of the object. That is, the difference between the absolute coordinates A acquired by the information processing apparatus 100 that time and the absolute coordinates A acquired by the information processing apparatus 100 the previous time can be acquired as the physical quantity of the object, for example. Further, the information processing apparatus 100 can also acquire, as the physical quantity of the object, an angular velocity value detected by a gyro sensor which is built into the controller operated by the user, for example.

The information processing apparatus 100 can acquire, as the physical quantity of the object, an acceleration value detected by an acceleration sensor which is built into the controller, and can also acquire, as the physical quantity of the object, an angular acceleration value detected by an angular acceleration sensor which is built into the controller. The information processing apparatus 100 can calculate the relative coordinates R depending on the physical quantity of the object which can be obtained as described above and on the absolute coordinates A.

There are various techniques for the information processing apparatus 100 to calculate the relative coordinates R depending on the absolute coordinates A and the physical quantity of the object. Examples thereof include (1) vibration suppression, (2) conversion of velocity gain, (3) attraction toward specific region, and (4) elimination of unintended motion. Those examples will be described later with reference to FIG. 2 and FIG. 3.

As described above, there occurs a displacement between the absolute coordinates A and the relative coordinates R. In the present embodiment, the information processing apparatus 100 uses a technique involving causing a pointer to be displayed at a position indicated by the relative coordinates R on the screen 210, and then causing the displayed pointer to be asymptotic to or correspondent to the absolute coordinates A. Accordingly, it becomes possible to reduce the possibility of confusing the user while ensuring the user-friendliness. That is, while ensuring the operation feeling for the user U by displaying the pointer at the position indicated by the relative coordinates R, intuitive feeling imparted to the user U can be maintained by moving the displayed pointer to the absolute coordinates A.

[1-2. Example of Noise Reduction Used by Coordinate Calculation Section]

Figure 2:
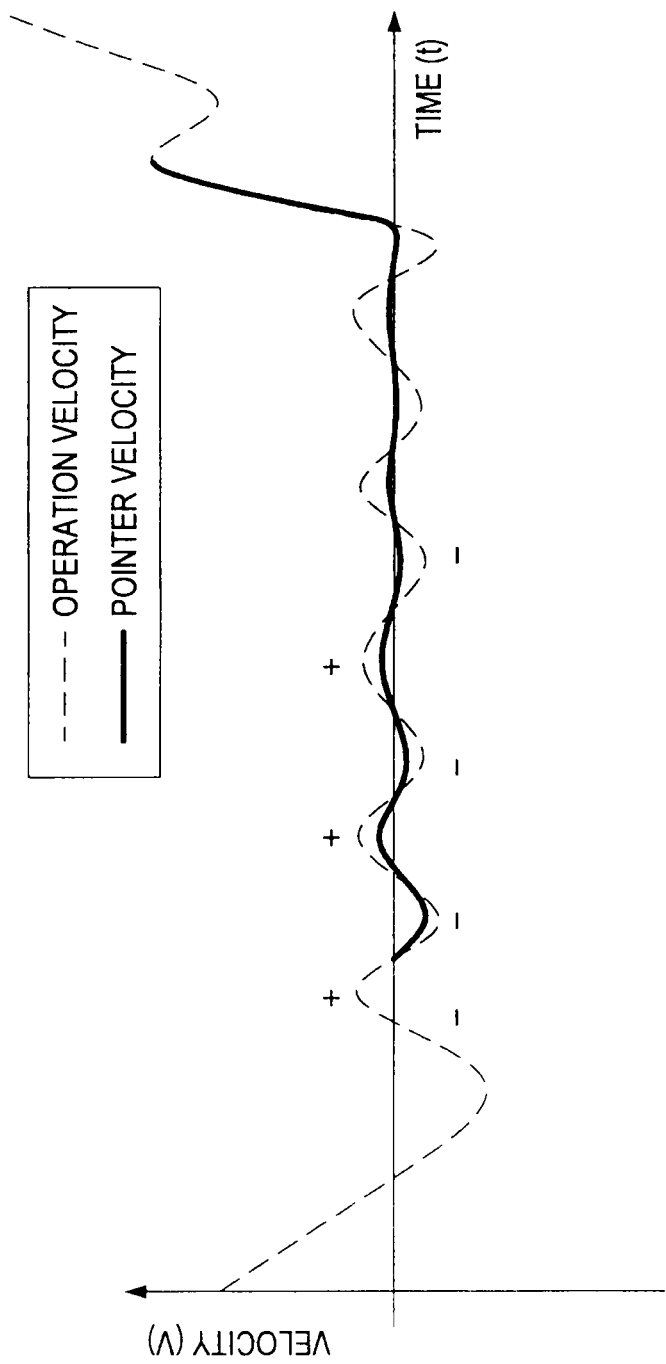
FIG. 2 is a diagram illustrating an example of noise reduction used for calculating relative coordinates by a coordinate calculation section of an information processing apparatus according to the embodiment.

FIG. 2 is a diagram illustrating an example of noise reduction used for calculating relative coordinates by a coordinate calculation section of an information processing apparatus according to the embodiment of the present invention. With reference to FIG. 2, an example of noise reduction used for calculating relative coordinates by the coordinate calculation section of the information processing apparatus according to the embodiment will be described. The noise reduction corresponds to (1) vibration suppression, which is mentioned above.

As shown in FIG. 2, it is assumed that velocity (hereinafter, also referred to as "operation velocity") at which an operating tool (hand or the like) is moved by the user U is changed with the elapse of time. In the case of assuming that an input system using a camera such as an input system using hand gesture is used, an influence of high-frequency noise attributed to inaccuracy of image processing is large, and it is necessary to effectively eliminate the noise attributed to the input system rather than blurring due to hand movement. According to the reason above, the technique is effective, in which a pointer velocity is determined by changing the gain based on frequency of changes in signs of the operation velocity.

In more detail, as shown in FIG. 2, in the case where the frequency of changes in signs of the operation velocity is larger than a predetermined value, the pointer velocity is lowered by lowering the gain. Such a technique uses a nonlinear filter, and hence, the relative coordinates R obtained by integrating the operation velocity is deviated from the absolute coordinates A. The coordinate calculation section 112 according to the embodiment of the present invention can calculate the relative coordinates R by such a technique, for example. Detail of the technique is disclosed in WO2009/035124, for example.

Further, the technique can be also applied to, in addition to the case of using the input system using a camera, the case of using an input system using a controller provided with a proximity or contact detection sensor such as a capacitance sensor. It is possible that the touch panel may recognize an operating tool present at a position in the air (for example, a position about 2 to 3 cm away from a panel surface) by lowering the resolution, but there is an issue that the noise increases and the detection coordinates of the operating tool is unstable. Consequently, by such a technique, the noise can be effectively eliminated by controlling the pointer velocity based on changes in signs of the operation velocity.

[1-3. Example of Velocity Gain Control Used by Coordinate Calculation Section]

Figure 3:
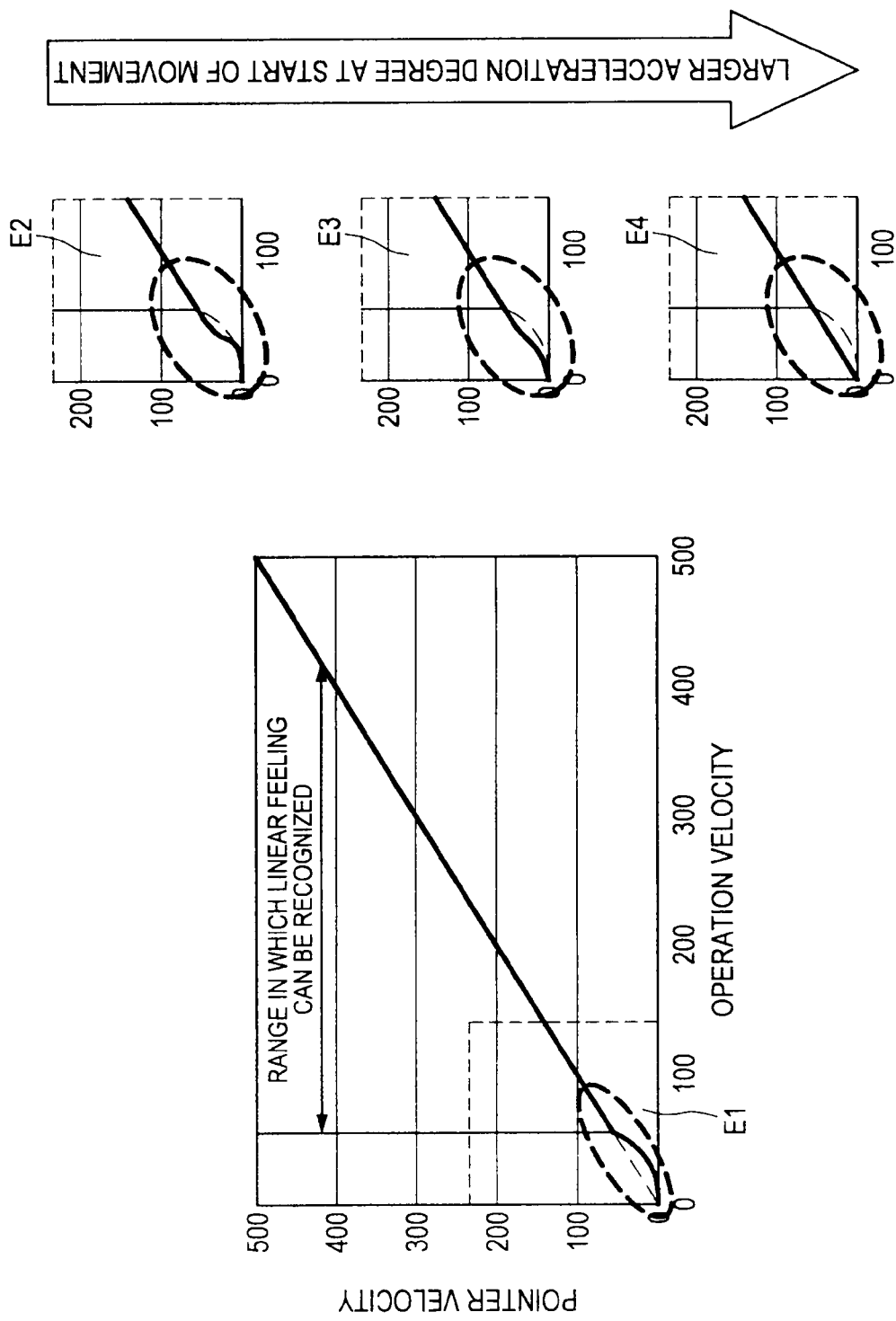
FIG. 3 is a diagram illustrating an example of velocity gain control used for calculating the relative coordinates by the coordinate calculation section of the information processing apparatus according to the embodiment.

FIG. 3 is a diagram illustrating an example of velocity gain control used for calculating the relative coordinates by the coordinate calculation section of the information processing apparatus according to the embodiment of the present invention. With reference to FIG. 3, an example of velocity gain control used for calculating the relative coordinates by the coordinate calculation section of the information processing apparatus according to the embodiment will be described. The velocity gain control corresponds to (2) conversion of velocity gain, which is mentioned above.

As shown in FIG. 3, there may be set a part in which a pointer velocity with respect to an operation velocity measured by a gyro sensor or the like is linearly changed and a part in which the pointer velocity is not linearly changed. The part in which the pointer velocity is linearly changed represents a range in which a person can empirically recognize the linear feeling, and the part in which the pointer velocity is not linearly changed represents a range in which user-friendliness is emphasized. Owing to the user-friendliness, it becomes possible for the user U to place the pointer on details, for example. For example, the operation velocity may be measured by a technique other than the technique of using the gyro sensor, and may also be measured from video taken by using a camera. The pointer is an example of an indicator displayed at the relative coordinates R.

In more detail, as shown in FIG. 3, in the case where the operation velocity is less than a predetermined value, the pointer velocity is lowered by lowering the velocity gain. Such a technique uses a nonlinear filter, and hence, the relative coordinates R obtained by integrating the operation velocity is deviated from the absolute coordinates A. The coordinate calculation section 112 according to the embodiment of the present invention can calculate the relative coordinates R by such a technique, for example. Detail of the technique is disclosed in WO2009/069531, for example.

Subsequently, (3) attraction toward specific region, which is mentioned above, will be described. For example, in the case where a specific region such as an icon is displayed and the user U selects the specific region by placing the pointer on the specific region, operability for the user U is enhanced when the pointer moves in a manner that the pointer is sucked toward the specific region at the stage of the pointer approaching the specific region. The pointer is an example of an indicator displayed at the relative coordinates R. Such a technique uses a nonlinear filter, and hence, the relative coordinates R obtained by integrating the operation velocity is deviated from the absolute coordinates A. The coordinate calculation section 112 according to the embodiment of the present invention can calculate the relative coordinates R by such a technique, for example. Detail of the technique is disclosed in WO2008/149991, for example.

Subsequently, (4) elimination of unintended motion, which is mentioned above, will be described. For example, when moving a pointer, there is a case where the pointer is moved in an oblique direction or the like which is the direction not intended by the user U. For example, the case where the user U presses a button corresponds to such a case. When the movement direction of the pointer is inclined toward a predetermined direction in order to prevent such movement, operability for the user U enhances. The pointer is an example of an indicator displayed at the relative coordinates R. Such a technique uses a nonlinear filter, and hence, the relative coordinates R obtained by integrating the operation velocity is deviated from the absolute coordinates A. The coordinate calculation section 112 according to the embodiment of the present invention can calculate the relative coordinates R by such a technique, for example. Detail of the technique is disclosed in WO2008/156141, for example.

By using the techniques described above, the coordinate calculation section 112 of the information processing apparatus 100 can calculate the relative coordinates R. However, as described above, the relative coordinates R calculated by such techniques is deviated from the absolute coordinates A. Accordingly, the coordinate calculation section 112 of the information processing apparatus 100 causes the relative coordinates R calculated by the coordinate calculation section 112 to be asymptotic to or correspondent to the absolute coordinates A detected by a position detection section 111, while taking into consideration not to impart an uncomfortable feeling to the user U.

[1-4. Functional Configuration of Information Processing Apparatus]

Figure 4:
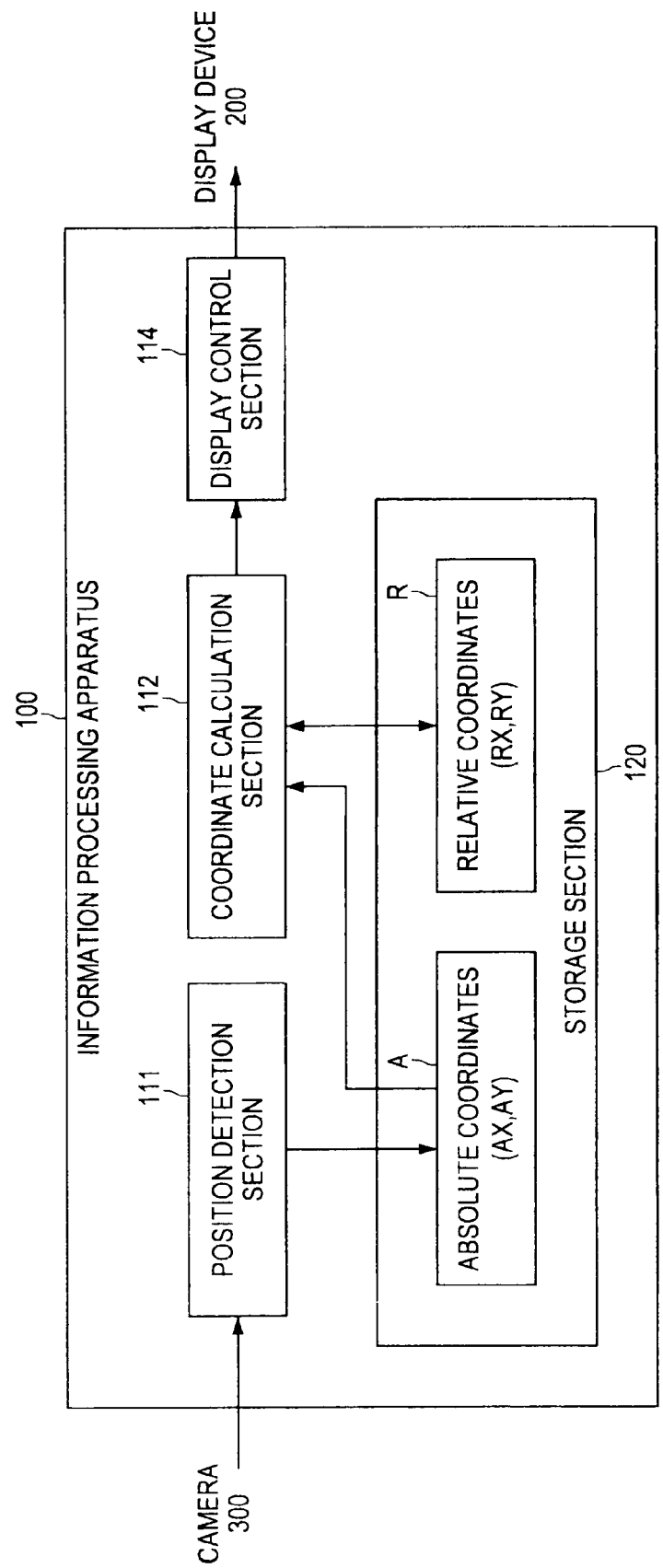
FIG. 4 is a diagram showing a functional configuration of the information processing apparatus according to the embodiment.

FIG. 4 is a diagram showing a functional configuration of the information processing apparatus according to the embodiment of the present invention. With reference to FIG. 4, the functional configuration of the information processing apparatus according to the embodiment will be described.

As shown in FIG. 4, an information processing apparatus 100 includes a position detection section 111, a coordinate calculation section 112, a display control section 114, and a storage section 120. Hereinafter, functions which those functional blocks have will be described.

The position detection section 111 has a function of detecting a position of an object. Here, as described above, the object represents, but is not limited to, an operating tool of the user U which is obtained by analyzing video acquired via a reception device (not shown) from the camera 300. For example, the object may be an operating tool of the user U which is obtained by analyzing video already recorded in the storage section 120.

In addition thereto, the position detection section 111 can detect, as the position of the object, at least one of the following positions: a position of an operating tool detected by a touch panel; a position of a substance included in a moving image which is being reproduced; a position designated by a controller operated by the user; a position of an operating tool detected by an ultrasonic sensor; and a position of an operating tool detected by a magnetic sensor.

The position detection section 111 includes, for example, a CPU (Central processing unit) and a RAM (Random Access Memory), and the function of the position detection section 111 is realized by developing in the RAM a program recorded in the storage section 120 and executing the developed program by the CPU. The position detection section 111 may include a dedicated hardware.

The coordinate calculation section 112 has functions of calculating absolute coordinates A based on the position of the object detected by the position detection section 111, and calculating relative coordinates R, which indicate a display position of the object on the screen 210, depending on the absolute coordinates A and a motion of the object. There are assumed various motions as the motion of the object. For example, the coordinate calculation section 112 time-differentiates the absolute coordinates A detected by the position detection section 111, and a velocity value of the object obtained by time-differentiation can be used as the motion of the object. The motion of the object is an example of the physical quantity of the object, which is described above.

Further, the coordinate calculation section 112 can also use, as the motion of the object, at least one of the following: an angular velocity value detected by a gyro sensor which is built into a controller operated by the user U; an acceleration value detected by an acceleration sensor which is built into the controller; and an angular acceleration value detected by an angular acceleration sensor which is built into the controller.

As for the technique for calculating the relative coordinates R, there are also assumed various techniques. For example, when the technique of "(2) conversion of velocity gain" is used, the coordinate calculation section 112 can calculate the relative coordinates R in a manner that as an amount of the motion of the object is smaller, an amount of change (velocity gain) of the relative coordinates R with respect to the absolute coordinates A becomes smaller.

Further, for example, when the technique of "(1) vibration suppression" is used, the coordinate calculation section 112 can calculate the relative coordinates R in a manner that, in the case of using the velocity value of the object or the angular velocity value of the object as the physical quantity of the object, as the frequency of changes in signs of the velocity value of the object or the angular velocity value of the object is larger, an amount of change (gain) of the relative coordinates with respect to the absolute coordinates A becomes smaller.

The coordinate calculation section 112 includes, for example, a CPU and a RAM, and the function of the coordinate calculation section 112 is realized by developing in the RAM a program recorded in the storage section 120 and executing the developed program by the CPU. The coordinate calculation section 112 may include a dedicated hardware.

Further, the coordinate calculation section 112 has a function of moving the calculated relative coordinates R in order for the calculated relative coordinates R to be asymptotic to or correspondent to the calculated absolute coordinates A based on a predetermined condition. Here, the phrase "to be asymptotic to" refers to that the relative coordinates R is sequentially moved closer to the absolute coordinates A, or that the relative coordinates R is sequentially moved closer to the absolute coordinates A and then is caused to be correspondent to the absolute coordinates A. The phrase "to be correspondent to" refers to that the relative coordinates R is caused to be correspondent to the absolute coordinates A in a discontinuous way, without going through a process of moving the relative coordinates R closer to the absolute coordinates A. The coordinate calculation section 112 and the predetermined condition will be described in more detail with reference to FIG. 5 and figures that follow.

The display control section 114 has a function of displaying an indicator at a display position which corresponds to the relative coordinates R on the screen 210 of the display device 200. Further, the display control section 114 has a function of, after displaying the indicator at the display position on the screen 210 indicated by the relative coordinates R which are calculated by the coordinate calculation section 112, moving the displayed indicator to a position on the screen 210 indicated by the relative coordinates R which have been caused to be asymptotic to or correspondent to the absolute coordinates A by the coordinate calculation section 112.

The display control section 114 includes, for example, a CPU and a RAM, and the function of the display control section 114 is realized by developing in the RAM a program recorded in the storage section 120 and executing the developed program by the CPU. The display control section 114 may include a dedicated hardware.

[1-5. Function that Coordinate Calculation Section of Information Processing Apparatus has]

Figure 5:
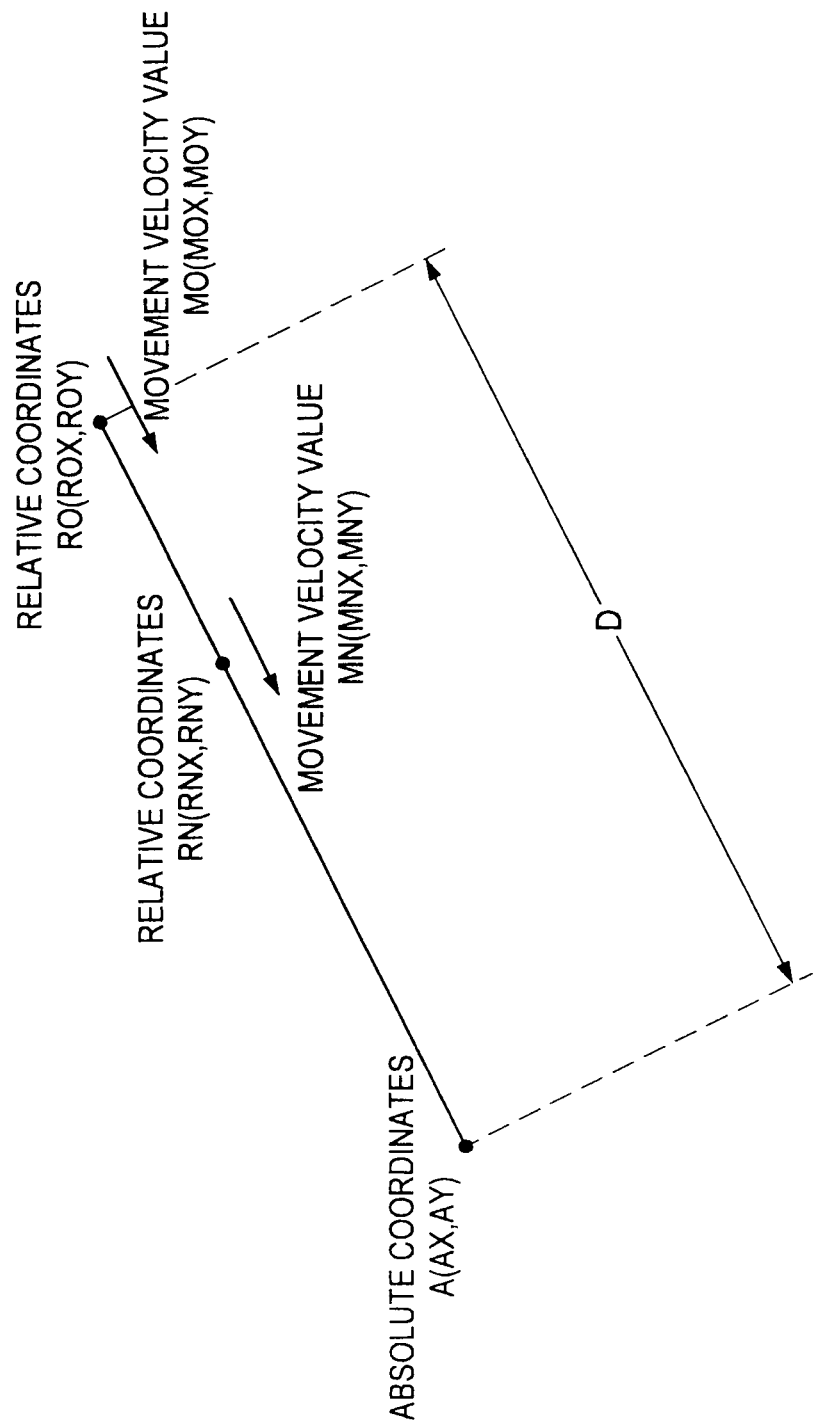
FIG. 5 is a diagram illustrating a function that the coordinate calculation section of the information processing apparatus according to the embodiment has.

FIG. 5 is a diagram illustrating a function that the coordinate calculation section of the information processing apparatus according to the embodiment of the present invention has. With reference to FIG. 5, the function that the coordinate calculation section of the information processing apparatus according to the embodiment has will be described.

It is assumed that absolute coordinates A(AX, AY) is detected by the position detection section 111, and relative coordinates RO(ROX, ROY) is calculated by the coordinate calculation section 112. A movement velocity value MO(MOX, MOY) represents a movement velocity value at the relative coordinates RO(ROX, ROY). As shown in FIG. 5, a deviation occurs between the absolute coordinates A(AX, AY) and the relative coordinates RO(ROX, ROY). Further, in FIG. 5, the deviation between the absolute coordinates A(AX, AY) and the relative coordinates RO(ROX, ROY) is represented by "D". As described above, the coordinate calculation section 112 performs the processing of causing relative coordinates R to be asymptotic to or correspondent to the absolute coordinates A(AX, AY). Here, the relative coordinates R which is in the process of being caused to be asymptotic to the absolute coordinates A(AX, AY) is represented by relative coordinates RN(RNX, RNY). A movement velocity value MN(MNX, MNY) represents a movement velocity value at the relative coordinates RN(RNX, RNY).

As shown in FIG. 5, by sequentially moving the relative coordinates RN(RNX, RNY) on a line segment from the absolute coordinates A(AX, AY) to the relative coordinates RO(ROX, ROY), the coordinate calculation section 112 can cause the relative coordinates RN(RNX, RNY) to be asymptotic to the absolute coordinates A(AX, AY). In this way, the movement of the relative coordinates RN(RNX, RNY) can be completed in a short period of time. The relative coordinates RN(RNX, RNY) may be moved along a curve connecting the absolute coordinates A(AX, AY) and the relative coordinates RO(ROX, ROY). The display control section 114 may move a displayed indicator to the position on the screen 210 indicated by the relative coordinates RN(RNX, RNY) which represent coordinates in the process of being caused to be asymptotic to the absolute coordinates A(AX, AY).

For example, the coordinate calculation section 112 may cause the relative coordinates RN(RNX, RNY) to be asymptotic to the absolute coordinates A(AX, AY) with a velocity value depending on a velocity value of the object or an angular velocity value of the object. The way of acquiring the velocity value of the object or the angular velocity value of the object is not particularly limited. The velocity value of the object corresponds to the movement velocity value MO(MOX, MOY).

[1-6. Technique (Part 1) of Causing Relative Coordinates to be Correspondent to or Asymptotic to Absolute Coordinates]

Figure 6:
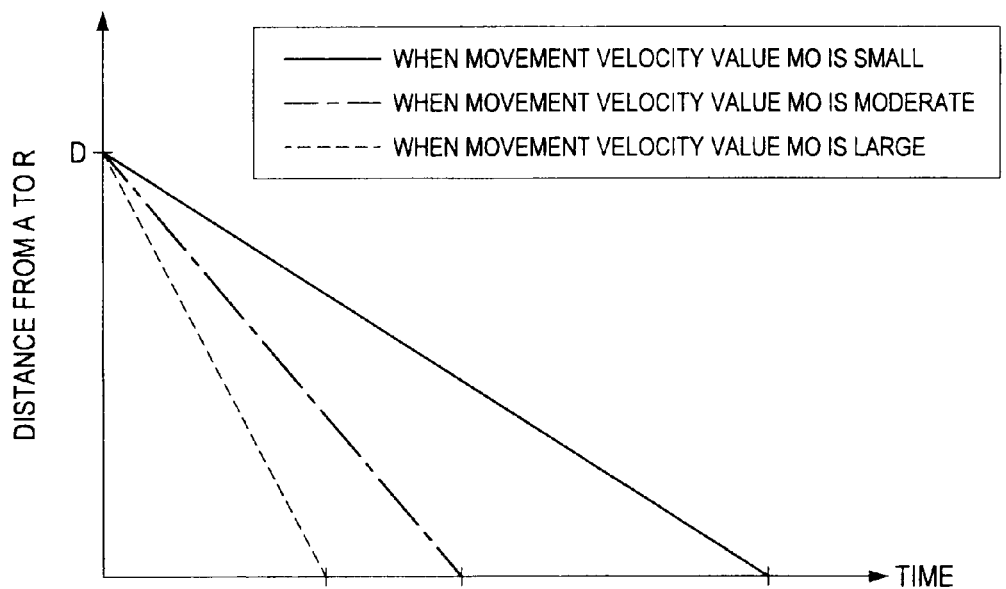
FIG. 6 is a diagram illustrating a technique (part 1) for the coordinate calculation section of the information processing apparatus according to the embodiment to cause relative coordinates to be correspondent to or asymptotic to absolute coordinates.

FIG. 6 is a diagram illustrating a technique (part 1) for the coordinate calculation section of the information processing apparatus according to the embodiment of the present invention to cause relative coordinates to be correspondent to or asymptotic to absolute coordinates. With reference to FIG. 6, the technique (part 1) for the coordinate calculation section of the information processing apparatus according to the embodiment to cause relative coordinates to be correspondent to or asymptotic to absolute coordinates will be described.

As shown in FIG. 6, the coordinate calculation section 112 may determine the movement velocity value MN(MNX, MNY) depending on the movement velocity value MO(MOX, MOY), for example. More specifically, for example, the coordinate calculation section 112 may increase the movement velocity value MN(MNX, MNY) as the movement velocity value MO(MOX, MOY) increases. That is, the coordinate calculation section 112 may cause the relative coordinates to be asymptotic to the absolute coordinates with a larger velocity value as the velocity value of the object or the angular velocity value of the object is larger. For example, the coordinate calculation section 112 may set a same value for the movement velocity value MO(MOX, MOY) and the movement velocity value MN(MNX, MNY).

[1-7. Technique (Part 2) of Causing Relative Coordinates to be Correspondent to or Asymptotic to Absolute Coordinates]

Figure 7:
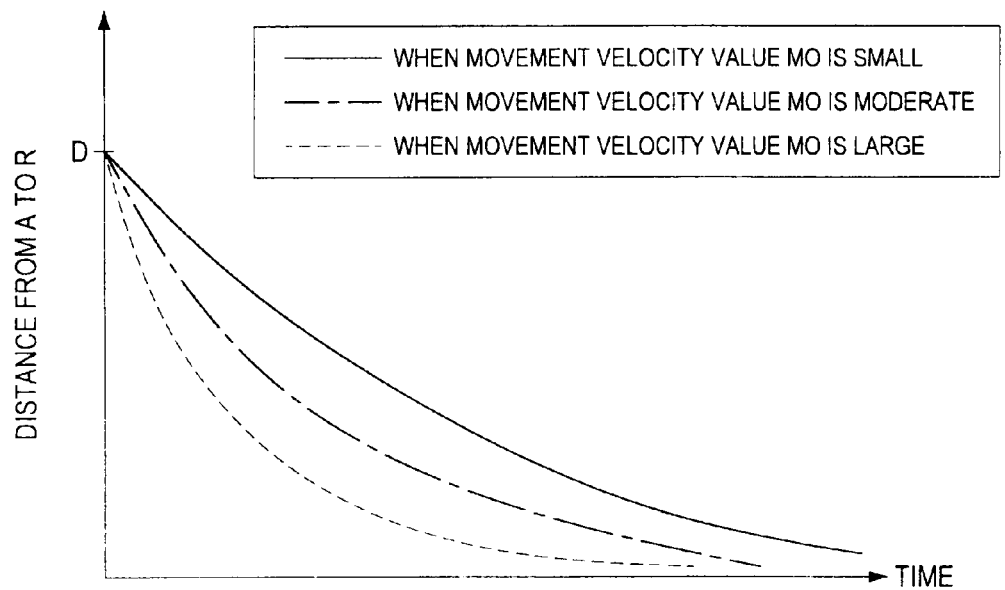
FIG. 7 is a diagram illustrating a technique (part 2) for the coordinate calculation section of the information processing apparatus according to the embodiment to cause the relative coordinates to be correspondent to or asymptotic to the absolute coordinates.

FIG. 7 is a diagram illustrating a technique (part 2) for the coordinate calculation section of the information processing apparatus according to the embodiment of the present invention to cause the relative coordinates to be correspondent to or asymptotic to the absolute coordinates. With Reference to FIG. 7, the technique (part 2) for the coordinate calculation section of the information processing apparatus according to the embodiment to cause the relative coordinates to be correspondent to or asymptotic to the absolute coordinates will be described.

As shown in FIG. 7, the coordinate calculation section 112 may move the relative coordinates RN(RNX, RNY) with the movement velocity value MN(MNX, MNY) depending on the distance from the absolute coordinates A(AX. AY) to the relative coordinates RN(RNX, RNY), for example. In this way, the movement velocity value MN(MNX, MNY) decreases as the relative coordinates RN(RNX, RNY) approaches absolute coordinates A(AX. AY), and hence, it becomes easier to grasp the place of a destination.

[1-8. Technique (Part 3) of Causing Relative Coordinates to be Correspondent to or Asymptotic to Absolute Coordinates]

Figure 8:
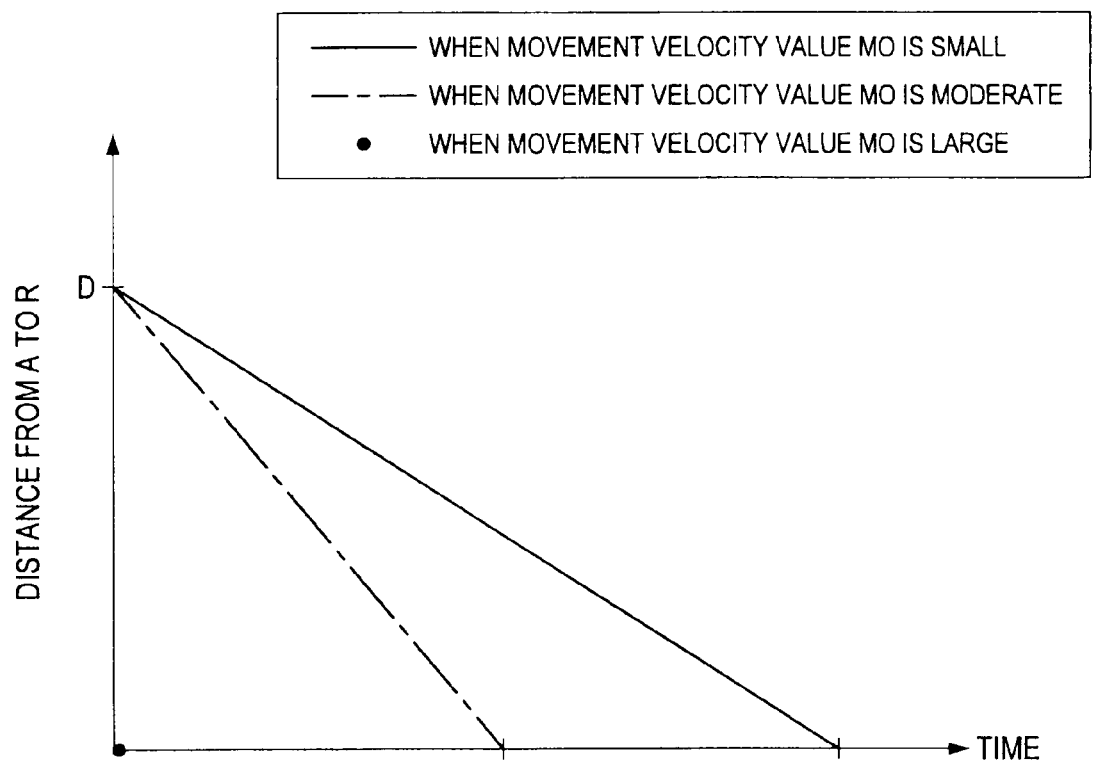
FIG. 8 is a diagram illustrating a technique (part 3) for the coordinate calculation section of the information processing apparatus according to the embodiment to cause the relative coordinates to be correspondent to or asymptotic to the absolute coordinates.

FIG. 8 is a diagram illustrating a technique (part 3) for the coordinate calculation section of the information processing apparatus according to the embodiment of the present invention to cause the relative coordinates to be correspondent to or asymptotic to the absolute coordinates. With reference to FIG. 8, the technique (part 3) for the coordinate calculation section of the information processing apparatus according to the embodiment to cause the relative coordinates to be correspondent to or asymptotic to the absolute coordinates will be described.

The coordinate calculation section 112 may determine whether to cause the relative coordinates RN(RNX, RNY) to be correspondent to the absolute coordinates A(AX, AY) or to cause the relative coordinates RN(RNX, RNY) to be asymptotic to the absolute coordinates A(AX, AY) based on the magnitude relation between a distance D from the absolute coordinates A(AX, AY) to the relative coordinates RO(ROX, ROY) and a predetermined value, for example. As shown in FIG. 8, for example, in the case of determining that the distance D is larger than the predetermined value, the coordinate calculation section 112 can cause the relative coordinates RN(RNX, RNY) to be correspondent to the absolute coordinates A(AX, AY) without going through a process of causing the relative coordinates RN(RNX, RNY) to be asymptotic to the absolute coordinates A(AX, AY).

In addition, there can be assumed variations in the technique. For example, the coordinate calculation section 112 may move the relative coordinates RN(RNX, RNY) with a velocity value depending on frequency of changes in signs of the velocity value of the object or the angular velocity value of the object. More specifically, the coordinate calculation section 112 may move the relative coordinates RN(RNX, RNY) with a larger velocity value as the frequency of changes in signs of the velocity value of the object or the angular velocity value of the object is smaller.

Further, the coordinate calculation section 112 may determine whether to cause the relative coordinates RN(RNX, RNY) to be correspondent to the absolute coordinates A(AX, AY) or to cause the relative coordinates RN(RNX, RNY) to be asymptotic to the absolute coordinates A(AX, AY) based on the magnitude relation between the frequency of changes in signs of the velocity value of the object or the angular velocity value of the object and a predetermined value.

In the case where the absolute coordinates A(AX, AY) is not detected by the position detection section 111, the coordinate calculation section 112 may not cause the relative coordinates RN(RNX, RNY) to be asymptotic to or correspondent to the absolute coordinates A(AX, AY) until the absolute coordinates A(AX, AY) is detected. Then, when the absolute coordinates A(AX, AY) is detected, the coordinate calculation section 112 may cause the relative coordinates RN(RNX, RNY) to be correspondent to the detected absolute coordinates A(AX, AY).

[1-9. Displacement of Relative Coordinates in Case of Using LPF]

Figure 9:
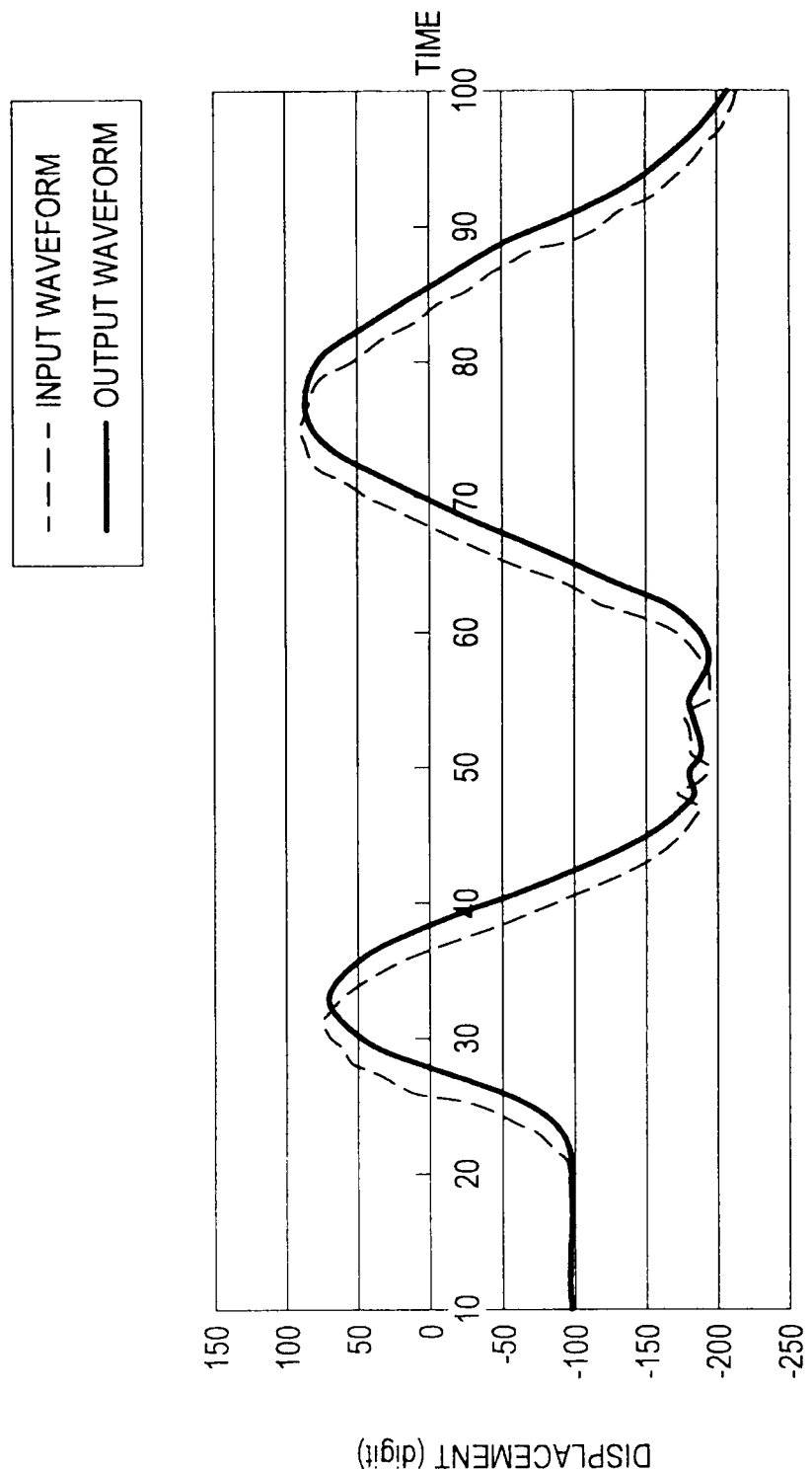
FIG. 9 is a diagram showing change in displacement of relative coordinates with time in the case of using a general LPF (Low Pass Filter)

FIG. 9 is a diagram showing change in displacement of the relative coordinates R with time in the case of using a general LPF (Low Pass Filter). With reference to FIG. 9, the change in displacement of the relative coordinates R with time in the case of using a general LPF will be described.

Referring to FIG. 9, it is found that in the case of using a LPF, the displacement of the relative coordinates R is large, and also found that phase retardation occurs.

[1-10. Displacement of Relative Coordinates in Case of Performing Noise Reduction]

Figure 10:
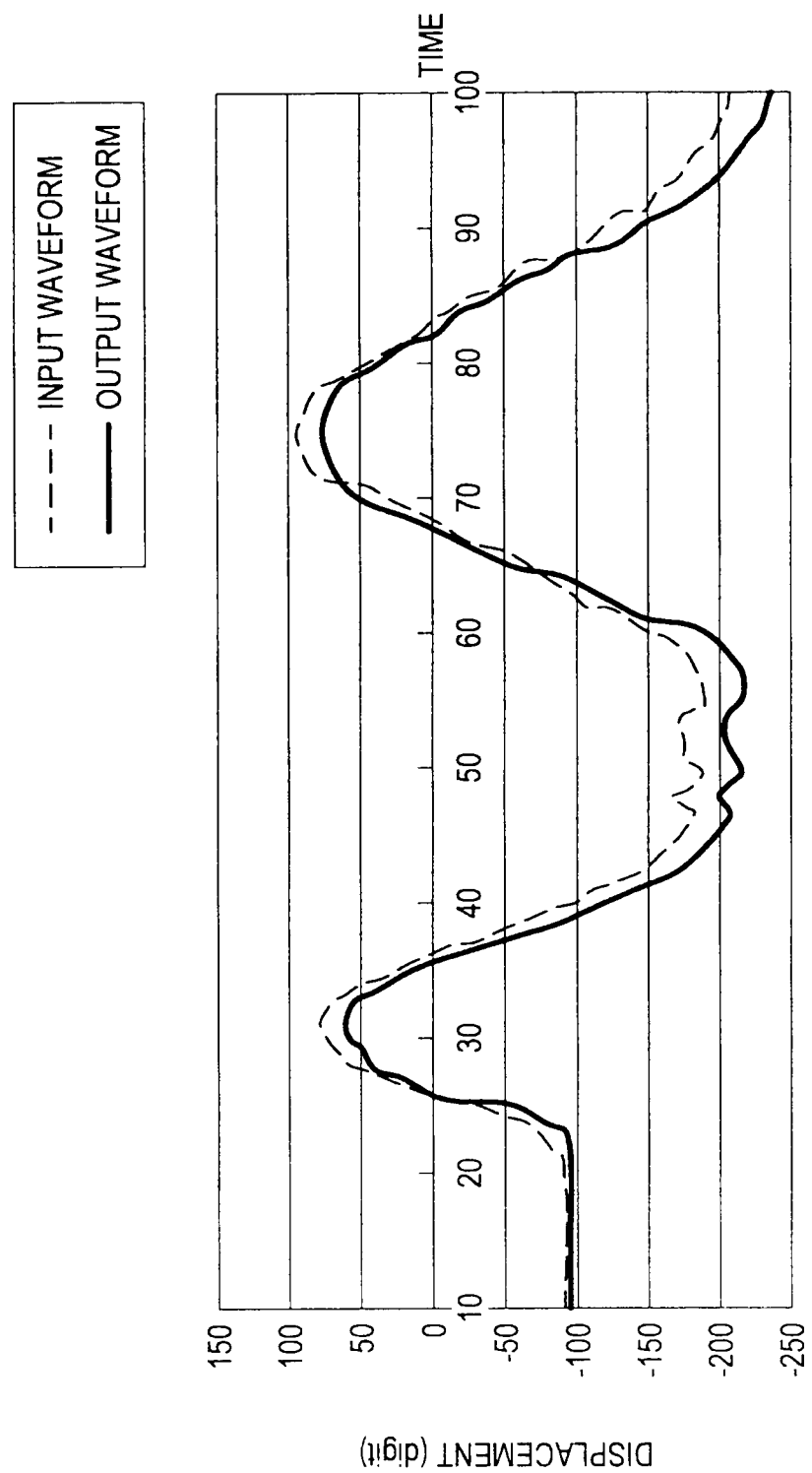
FIG. 10 is a diagram showing change in displacement of relative coordinates with time in the case where the coordinate calculation section of the information processing apparatus according to the embodiment of the present invention performs noise reduction and calculates the relative coordinates, and the coordinate calculation section does not perform processing of causing the relative coordinates to be correspondent to or asymptotic to absolute coordinates.

FIG. 10 is a diagram showing change in displacement of relative coordinates with time in the case where the coordinate calculation section of the information processing apparatus according to the embodiment of the present invention performs noise reduction and calculates the relative coordinates, and the coordinate calculation section does not perform processing of causing the relative coordinates to be correspondent to or asymptotic to absolute coordinates. With reference to FIG. 10, there will be described the change in displacement of relative coordinates with time in the case where the coordinate calculation section of the information processing apparatus according to the embodiment of the present invention performs noise reduction and calculates the relative coordinates, and the coordinate calculation section does not perform processing of causing the relative coordinates to be correspondent to or asymptotic to absolute coordinates.

Referring to FIG. 10, it is found that, in the case of using the nonlinear filter described above, the phase retardation is almost cancelled. However, since the relative coordinates R is not caused to be asymptotic to or correspondent to the absolute coordinates A, a slight deviation occurs in the displacement of the relative coordinates R.

[1-11. Displacement of Relative Coordinates in Case of Further Performing Compensation for Relative Coordinates]

Figure 11:
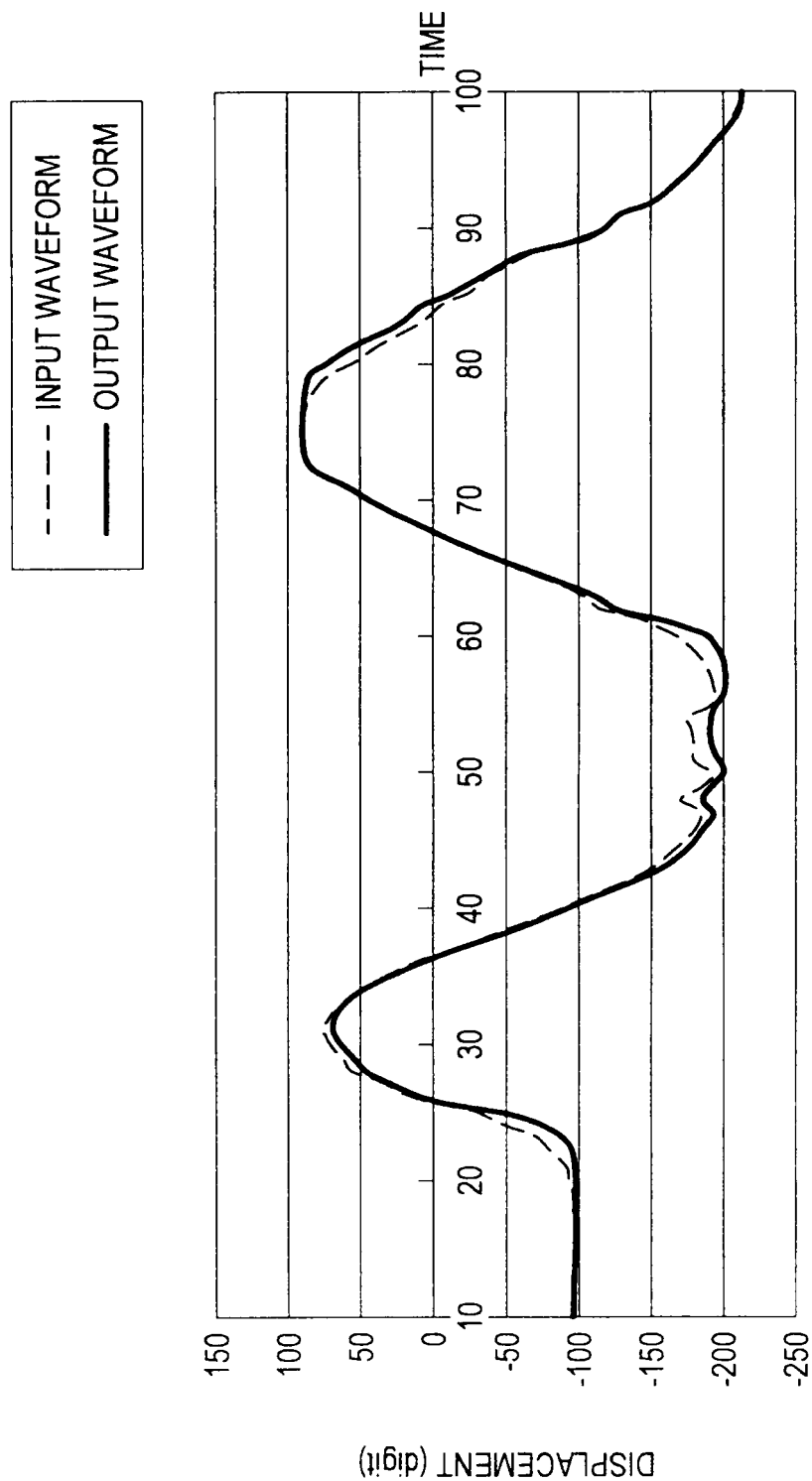
FIG. 11 is a diagram showing change in displacement of relative coordinates with time in the case where the coordinate calculation section of the information processing apparatus according to the embodiment performs noise reduction and calculates the relative coordinates, and the coordinate calculation section performs the processing of causing the relative coordinates to be correspondent to or asymptotic to the absolute coordinates.

FIG. 11 is a diagram showing change in displacement of relative coordinates with time in the case where the coordinate calculation section of the information processing apparatus according to the embodiment of the present invention performs noise reduction and calculates the relative coordinates, and the coordinate calculation section performs the processing of causing the relative coordinates to be correspondent to or asymptotic to the absolute coordinates. With reference to FIG. 11, there will be described the change in displacement of relative coordinates with time in the case where the coordinate calculation section of the information processing apparatus according to the embodiment performs noise reduction and calculates the relative coordinates, and the coordinate calculation section performs the processing of causing the relative coordinates to be correspondent to or asymptotic to the absolute coordinates.

Referring to FIG. 11, it is found that, in the case of further performing compensation for the relative coordinates, the phase retardation is almost cancelled and the deviation in the displacement of the relative coordinates is also almost cancelled.

[1-12. Flow of Processing Executed by Information Processing Apparatus]

Figure 12:
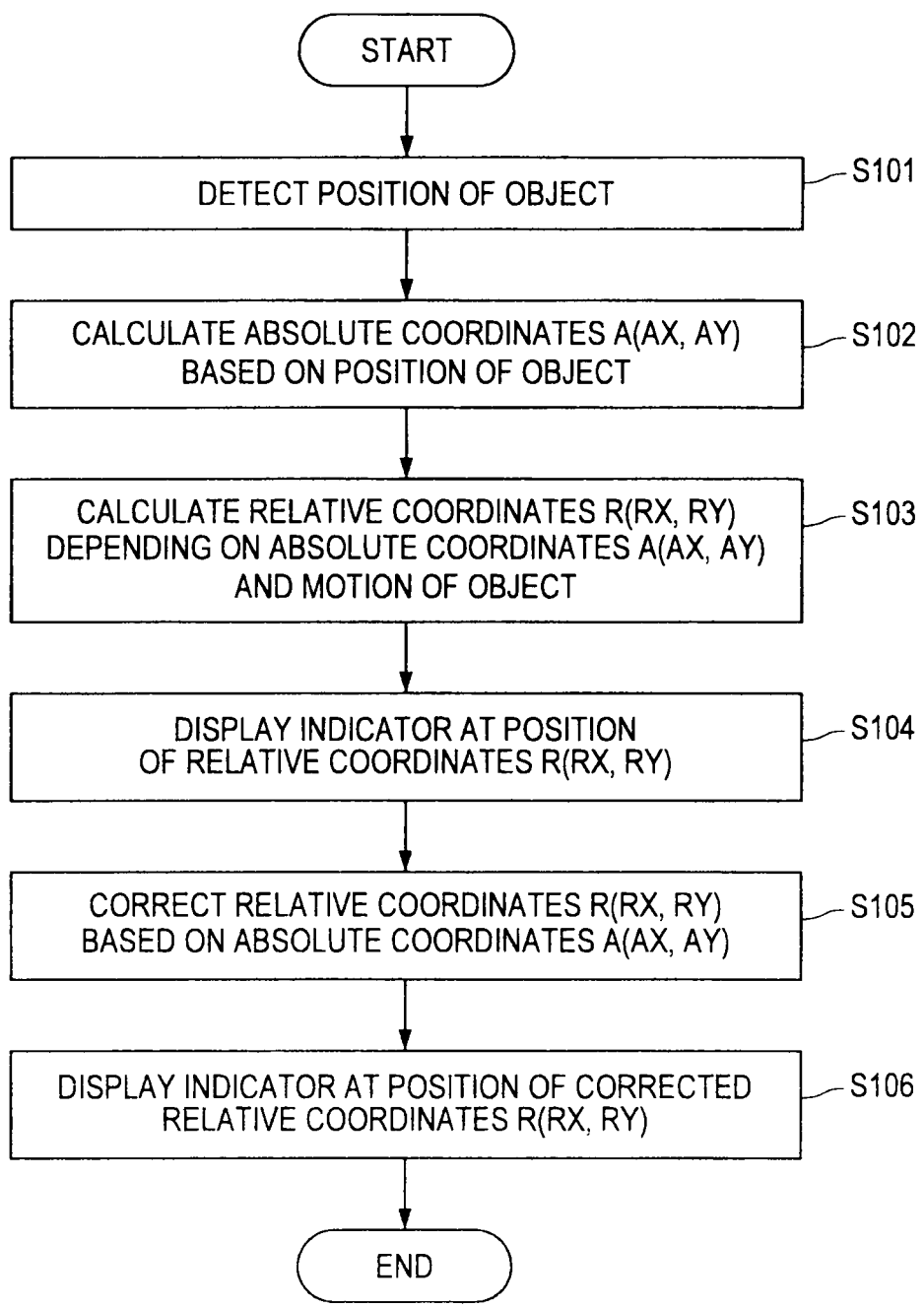
FIG. 12 is a flowchart showing a flow of processing executed by the information processing apparatus according to the embodiment.

FIG. 12 is a flowchart showing a flow of processing executed by the information processing apparatus according to the embodiment of the present invention. With reference to FIG. 12, the flow of processing executed by the information processing apparatus according to the embodiment will be described.

As shown in FIG. 12, the position detection section 111 detects a position of the object (step S101), and the coordinate calculation section 112 calculates the absolute coordinates A(AX, AY) based on the position of the object detected by the position detection section 111 (step S102), and calculates the relative coordinates R(RX, RY) depending on the absolute coordinates A(AX, AY) and the motion of the object (step S103). The display control section 114 causes an indicator to be displayed at the position indicated by the relative coordinates R(RX, RY) (step S104). Subsequently, the coordinate calculation section 112 corrects the relative coordinates R(RX, RY) based on the absolute coordinates A(AX, AY) (step S105), and the display control section 114 causes the indicator to be displayed at the position indicated by the corrected relative coordinates R(RX, RY) (step S106).

2. Modified Example

It should be understood by those skilled in the art that various modifications, combinations, sub-combinations and alterations may occur depending on design requirements and other factors insofar as they are within the scope of the appended claims or the equivalents thereof.

For example, the technology according to the present embodiment is not limited to the application for accepting the input of operation from the user U and can be applied widely to other various fields. For example, there is a case where facial recognition technology is used and representative coordinates of a recognized face is determined, and then a motion of the determined representative coordinates is acquired as a motion of the body. Here, since the motion of the face is often active, the variation of the representative coordinates is also often active, and hence, there was an issue that the motion of the body is accompanied with noise and it was difficult to acquire the motion. In this manner, the technology according to the present embodiment can be also applied to the field in which the input of operation from the user U, such as operation of determining a position of an object (e.g., face) from a photographed image, is not particularly necessary.

For example, it is not necessary that the information processing system according to the embodiment of the present invention execute the processing in the order shown in the flowcharts, and the order of the processing may be appropriately changed. Further, the information processing system according to the embodiment of the present invention may execute the processing shown in the flowcharts once, or may execute the processing multiple times repeatedly.

3. Summary

According to the present embodiment, it becomes possible to reduce the possibility of confusing the user while ensuring the user-friendliness. That is, while ensuring the operation feeling for the user U by displaying an object at the position indicated by the relative coordinates R, intuitive feeling imparted to the user U can be maintained by moving the displayed object to the absolute coordinates A.

The present application contains subject matter related to that disclosed in Japanese Priority Patent Application JP 2010-019083 filed in the Japan Patent Office on Jan. 29, 2010, the entire content of which is hereby incorporated by reference.

What is claimed is:

1. A gesture recognition system comprising:
a memory having instructions which when executed by motion detecting circuitry cause the motion detecting circuitry to
calculate absolute coordinates which indicate a first position on a screen based on the position of the detected object in space,
calculate relative coordinates, which indicate a second position on the screen which is different from the first position, based on the absolute coordinates and a motion of the object,
display an indicator at the second display position corresponding to the relative coordinates on the screen,
determine whether to cause the relative coordinates to be correspondent to the absolute coordinates or to cause the relative coordinates to be asymptotic to the absolute coordinates based in part on a magnitude relation between a distance from the absolute coordinates to the relative coordinates and a predetermined value, and
move, based on the determination, the relative coordinates in order for the relative coordinates to be asymptotic to or correspondent to the absolute coordinates such that the indicator is redisplayed on the screen at a position corresponding to the moved relative coordinates, wherein the motion detecting circuitry calculates the relative coordinates further based on a velocity value of the object obtained by time-differentiating the absolute coordinates and in a manner that as a frequency of changes in signs of a velocity value of the object or an angular velocity value of the object is larger, an amount of change of the relative coordinates with respect to the absolute coordinates becomes smaller, wherein, in response to the distance from the absolute coordinates to the relative coordinates being greater than the predetermined value and a movement velocity value at the relative coordinates being greater than a predetermined velocity value, the motion detecting causes the relative coordinates to be immediately moved to be correspondent to the absolute coordinates.

2. The information processing apparatus according to claim 1, wherein the motion detecting circuitry detects, as the position of the object, at least one position from among a position of an operating tool photographed by a camera, a position of an operating tool detected by a touch panel, a position of an operating tool detected by an ultrasonic sensor, and a position of an operating tool detected by a magnetic sensor.

3. The information processing apparatus according to claim 1, wherein the motion detecting circuitry calculates the relative coordinates based on at least one of an angular velocity value detected by a gyro sensor built into a controller operated by a user, an acceleration value detected by an acceleration sensor built into the controller, and an angular acceleration value detected by an angular acceleration sensor built into the controller.

4. The information processing apparatus according to claim 1, wherein the motion detecting circuitry calculates the relative coordinates in a manner that as an amount of the motion of the object is smaller, an amount of change of the relative coordinates with respect to the absolute coordinates becomes smaller.

5. The information processing apparatus according to claim 1, wherein the motion detecting circuitry further determines whether to cause the relative coordinates to be correspondent to the absolute coordinates or to cause the relative coordinates to be asymptotic to the absolute coordinates based on a magnitude relation between a velocity value of the object or an angular velocity value of the object and a predetermined value.

6. The information processing apparatus according to claim 1, wherein when the motion detecting circuitry determines to cause the relative coordinates to be asymptotic to the absolute coordinates, the motion detecting circuitry causes the relative coordinates to be asymptotic to the absolute coordinates with a velocity value depending on a distance from the absolute coordinates to the relative coordinates.

7. The information processing apparatus according to claim 1, wherein when the motion detecting circuitry determines to cause the relative coordinates to be asymptotic to the absolute coordinates, the motion detecting circuitry causes the relative coordinates to be asymptotic to the absolute coordinates with a velocity value depending on frequency of changes in signs of a velocity value of the object or an angular velocity value of the object.

8. The information processing apparatus according to claim 1, wherein when the motion detecting circuitry determines to cause the relative coordinates to be asymptotic to the absolute coordinates, the motion detecting circuitry causes the relative coordinates to be asymptotic to the absolute coordinates with a larger velocity value as frequency of changes in signs of a velocity value of the object or an angular velocity value of the object is smaller.

9. The information processing apparatus according to claim 1, wherein when the absolute coordinates is not detected by the motion detecting circuitry, the motion detecting circuitry does not cause the relative coordinates to be asymptotic to or correspondent to the absolute coordinates until the absolute coordinates is detected, and when the absolute coordinates is detected, the motion detecting circuitry causes the relative coordinates to be correspondent to the detected absolute coordinates.

10. The information processing apparatus according to claim 1, wherein when the motion detecting circuitry determines to cause the relative coordinates to be asymptotic to the absolute coordinates, the motion detecting circuitry causes the relative coordinates to be asymptotic to the absolute coordinates with a velocity value depending on a velocity value of the object or an angular velocity value of the object.

11. The information processing apparatus according to claim 10, wherein when the motion detecting circuitry determines to cause the relative coordinates to be asymptotic to the absolute coordinates, the motion detecting circuitry causes the relative coordinates to be asymptotic to the absolute coordinates with a larger velocity value as the velocity value of the object or the angular velocity value of the object is larger.

12. The information processing apparatus according to claim 1, wherein the motion detecting circuitry causes the relative coordinates to be asymptotic to the absolute coordinates by sequentially and asymptotically moving, on a line segment from the absolute coordinates to the relative coordinates, the relative coordinates.

13. The information processing apparatus according to claim 12, wherein moving the relative coordinates to be asymptotic to the absolute coordinates sequentially moves the relative coordinates closer to the absolute coordinates.

14. The information processing apparatus according to claim 13, wherein when the motion detecting circuitry determines to cause the relative coordinates to be asymptotic to the absolute coordinates, the motion detecting circuitry causes the relative coordinates to be asymptotic to the absolute coordinates with a velocity value depending on a velocity value of the object or an angular velocity value of the object.

15. The information processing apparatus according to claim 14, wherein when the motion detecting circuitry determines to cause the relative coordinates to be asymptotic to the absolute coordinates, the motion detecting circuitry causes the relative coordinates to be asymptotic to the absolute coordinates with a larger velocity value as the velocity value of the object or the angular velocity value of the object is larger.

16. An information processing method for providing gesture recognition, comprising:
    detecting, via motion detecting circuitry, a position of an object in an open space;
    calculating, via the motion detecting circuitry, absolute coordinates which indicate a first position on a screen based on the position of the object in space;
    calculating, via the motion detecting circuitry, relative coordinates, which indicate a second position on the screen which is different from the first position, based on the absolute coordinates and a motion of the object;
    displaying an indicator at the second display position corresponding to the relative coordinates on the screen;

determining, via the motion detecting circuitry, whether to cause the relative coordinates to be correspondent to the absolute coordinates or to cause the relative coordinates to be asymptotic to the absolute coordinates based in part on a magnitude relation between a distance from the absolute coordinates to the relative coordinates and a predetermined value; and moving, based on the determining, the relative coordinates in order for the relative coordinates to be asymptotic to or correspondent to the absolute coordinates such that the indicator is redisplayed on the screen at a position corresponding to the moved relative coordinates, wherein the motion detecting circuitry calculates the relative coordinates further based on a velocity value of the object obtained by time-differentiating the absolute coordinates and in a manner that as a frequency of changes in signs of a velocity value of the object or an angular velocity value of the object is larger, an amount of change of the relative coordinates with respect to the absolute coordinates becomes smaller, wherein, in response to the distance from the absolute coordinates to the relative coordinates being greater than the predetermined value and a movement velocity value at the relative coordinates being greater than a predetermined velocity value, the motion detecting causes the relative coordinates to be immediately moved to be correspondent to the absolute coordinates.

17. A non-transitory computer-readable medium having computer-readable instructions thereon which when executed by a computer cause the computer to perform a method for providing gesture recognition, the method comprising:

detecting a position of an object in an open space;

calculating, via motion detecting circuitry, absolute coordinates which indicate a first position on a screen based on the position of the object in space;

calculating, via the motion detecting circuitry, relative coordinates, which indicate a second position of at which the object is displayed on the screen which is different from the first position, based on the absolute coordinates and a motion of the object;

displaying an indicator at the second display position corresponding to the relative coordinates on the screen;

determining, via the motion detecting circuitry, whether to cause the relative coordinates to be correspondent to the absolute coordinates or to cause the relative coordinates to be asymptotic to the absolute coordinates based in part on a magnitude relation between a distance from the absolute coordinates to the relative coordinates and a predetermined value; and moving, based on the determining, the relative coordinates in order for the relative coordinates to be asymptotic to or correspondent to the absolute coordinates based on a predetermined condition such that the indicator is redisplayed on the screen at a position corresponding to the moved relative coordinates, wherein the motion detecting circuitry calculates the relative coordinates further based on a velocity value of the object obtained by time-differentiating the absolute coordinates and in a manner that as a frequency of changes in signs of a velocity value of the object or an angular velocity value of the object is larger, an amount of change of the relative coordinates with respect to the absolute coordinates becomes smaller, wherein, in response to the distance from the absolute coordinates to the relative coordinates being greater than the predetermined value and a movement velocity value at the relative coordinates being greater than a predetermined velocity value, motion detecting causes the relative coordinates to be immediately moved to be correspondent to the absolute coordinates.

* * * * *